2,958,096

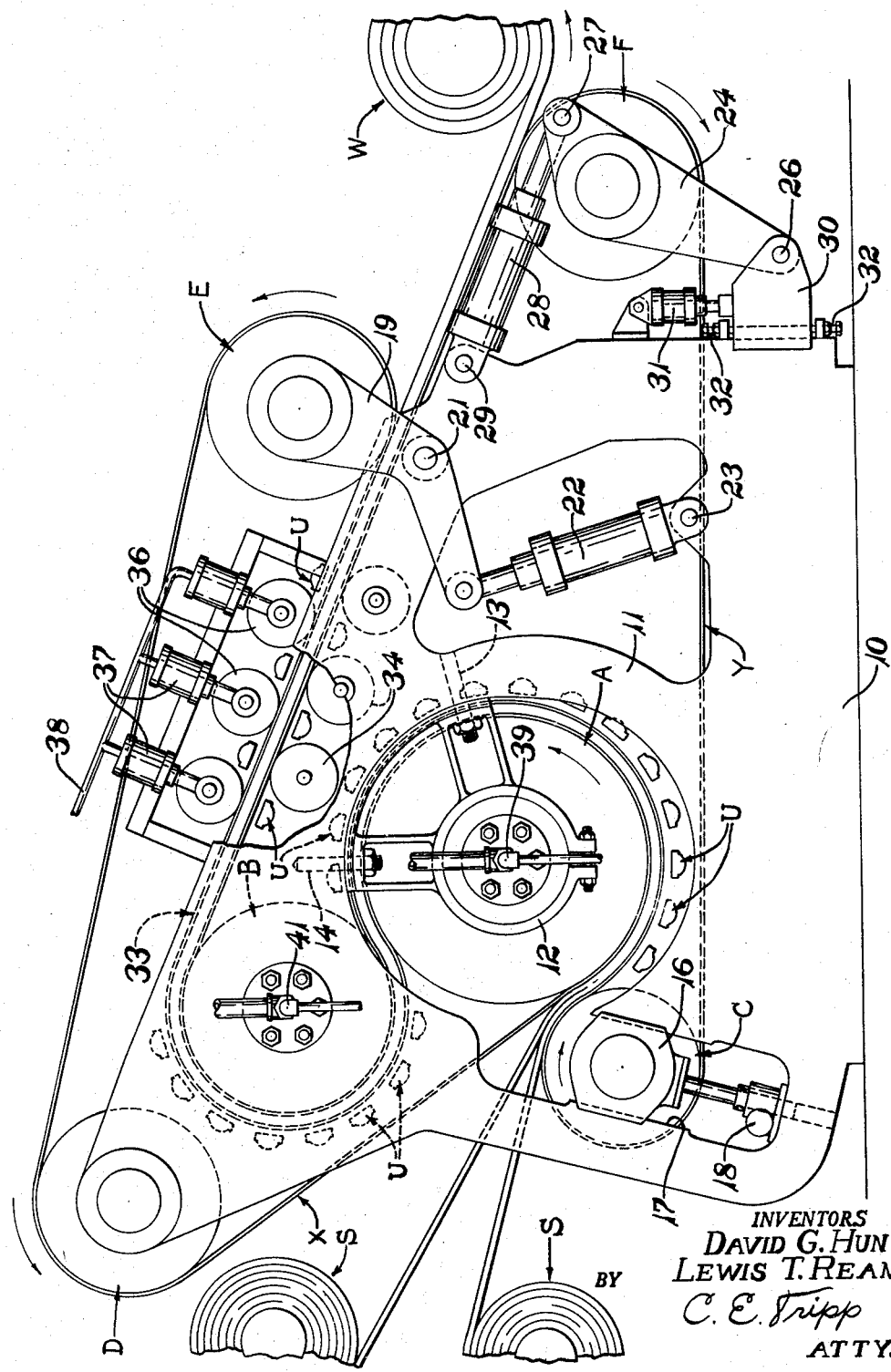

METHOD AND APPARATUS FOR CONTINUOUSLY CURING PLASTIC MATERIAL

David G. Hunt and Lewis T. Ream, Akron, Ohio, assignors to The B. F. Goodrich Company, New York, N.Y., a corporation of New York Filed Oct. 30, 1957, Ser. No. 693,461

6 Claims. (Cl. 18—6)

This invention relates to the continuous curing of elongated plastic articles such as flat belts, matting or the like, that are composed of such materials as natural or synthetic rubber, polyvinyl chloride and other elastomers, which materials may be in the form of composite fabric and elastomer strips or sheets, or combinations of sheets or strips formed solely of the aforesaid elastomers.

In the case of a laminated article such as a flat rubber and fabric conveyor belt, for example, the various laminations of rubberized fabric and rubber are preformed by processes known in this art, whereupon the various laminations are brought together and transverse pressure and heat are applied to the green article to expel trapped air, create a bond between the parts, and effect what is termed in the art a cure. The nature of the cure is determined by the nature and composition of the article being cured and this invention can be practiced with a number of articles of different structure and composition by adjusting the time-temperature relationships to which the articles are subjected. The process to which this invention relates is one in which the article is cured by application of heat applied while the article is subjected to mechanically applied force or pressure in order that the material will be compacted, trapped air expelled, and the desired surface finish, polish, or other surface configuration be imparted to the article during the time of its cure. The process also has applications for fusing and cooling under pressure laminations of plastic material such as polyvinyl chloride.

Continuous curing has two important advantages over the more common step by step platen press curing in that there is uniformity along the entire length of the article. With press curing the portions of the article at the ends of the press may be over or under cured unless exceedingly careful pains are taken to specifically control the end temperatures relative to the temperature in the body of the platens. Also, if configurations are imparted to the article during cure, these may not match at the portions of the article disposed at the ends of the press. On the other hand, the continuous cure process employing the conventional apparatus is often a comparatively slow process when employing drums and band tensions of practical size.

The principle employed to continuously cure articles of the type referred to is that of firmly pressing the article against a large heated drum while rotating the drum and simultaneously having the article move with the drum around a part of its periphery. The article is pressed against the drum by a steel band that is under heavy tension. In curing articles of the type described, there is a maximum temperature to which the article can be allowed to attain so that with a given size drum, linear drum speed must be regulated so that the cure will be completed during passage without exceeding that temperature. Of course, linear drum speed can be increased without reducing the curing time by using larger drums, but the larger the drums, the more massive, cumbersome and expensive become the parts of the apparatus. Also, as drum size increases so must the total tension on the steel band to maintain a given unit compressive force on the article. Finally, the heat transfer characteristics between the article and the drum on one side of the article and between the article and heated shoe frictionally pressing against the other side of the article are inherently different making perfect uniformity of introduction of heat to the article a problem.

These factors have led to the proposal of a two drum two band apparatus wherein the continuous curing, compacting and otherwise forming elongated articles such as described is accomplished by successively training the article partially around a pair of steam heated drums of large size, such as drums having a diameter of four or five feet. The article being cured is fed between a pair of steel bands that are placed in heavy tension and confine the opposing sides of the article alternately as the article and bands are trained around the drums. The peripheries of the drums are substantially tangential and they rotate oppositely. This spreads out the cure so that linear speed can be increased without increasing drum size, and also insures that each side of the article will have received both drum originated and externally supplied radiant heat. Also, steel band tension is not materially increased because each band need serve as a compacting member around only one drum whereas the total cure is divided between both drums.

In the present invention a still further increase in linear cure speed and a better internal structure is obtained without materially increasing band tension. This is accomplished by completing the cure in three steps, at the first drum, at the second drum, and at a straight reach while the belt is still confined between the two bands. This taking advantage of the two bands to provide for a straight reach cure gives an article that tends to be flat and has no internal stresses from side to side as might be the case if the cure were completed on a drum. Also, since most of the cure is made on the drums wherein the material is under high pressure from a steel band, surface polish or configurations can be adequately imparted to the article before it leaves the second drum. Thus, the pressure against the bands in the straight reach need only be high enough to give uniform heat transfer so that the cure can be extended and completed without materially adding to the already high tension on the steel bands.

Advantages are also obtained when two or more sheets of plastic material are fused under pressure in that the second drum and straight reach can be used to divide the cooling time, insuring that the material is down to the desired temperature before pressure is released, all while increasing the linear speed of travel over that of prior processes.

The manner in which these and other advantages may be obtained by one skilled in the art will be apparent from the accompanying single figure and specification.

In the following description of a preferred embodiment of the invention, only the elements essential to understanding the invention are described because continuous rotary curing presses are well-known in the art and such details as the drive mechanism, structural design elements, control of temperature and the like form no part of the invention.

The apparatus has a base 10 supporting a heavy frame 11 in which is rotatably mounted a first curing drum A mounted on heavy end bearing support structures 12 bolted to the frame by bolts such as 13, 14.

Two high tensile strength steel bands X and Y are trained partially around a stock entrance drum A and around other drums and rolls as will be described.

A second or stock exit curing drum B is mounted in the frame and positioned relative to first drum A so that on a line drawn through the centers of the drums, the peripheries of the drums are spaced no more than the space required to accommodate the thickest stock to be cured plus the thickness of the two steel bands.

At the stock entrance is disposed a pressure roll C, the ends of which rotate in bearing blocks 16 slidably mounted in guides 17 formed in the frame. In an apparatus of this type it is important that the stock be subjected to a very high direct pressure along the pressure roll C and against drum A as the stock enters the apparatus, hence a screw-down mechanism 18 is provided for pressure roll C to enable the operator to apply the desired pressure to any thickness of stock. Such mechanism is known in the art and the details thereof form no part of the invention.

Following the path of band X as it enters the apparatus at first curing drum A, the band is trained part way around (about 80%) and directly against drum A, whereupon it is reversely turned to train partially around second curing drum B (about 70%), except here band X does not lie against the curing drum, but rather against the stock, the band X now being on the outside relative to the drum B instead of on the inside as it was at first curing drum A.

After leaving second curing drum B, band X extends straight to a tension roll E, the roll being mounted on a pair of tension applying arms 19 that are pivoted to the frame as at 21, and each have their other ends pivotally connected to the piston rod of a hydraulic piston and cylinder assembly 22, the latter being, in turn, pivoted to the frame at 23. After leaving its tension roll E, band X passes in a straight line back to guide roll D, around the roll, and back to the machine entrance at first curing drum A.

Following the path of band Y as it enters the apparatus at first curing drum A, the band is trained part way around the drum but band Y presses against the stock being cured as it passes around the drum, whereupon it is reversely turned to train partially around and directly against second curing drum B. After leaving the drum, band Y extends in a straight line parallel to band X, the stock being confined between the two bands until band X curves upwardly around its tension roll E.

Band Y continues in its straight path until it reaches its tension roll F, which roll is mounted on a pair of tension arms 24 each of which is pivotally mounted at 26 at one end and has a pivot 27 at the other for connection to a piston and cylinder assembly 28 pivoted to the frame at 29.

In order to adjust the spacing between the bands where they run parallel, pivot mountings 26 for tension arms 24 and roll F are each formed on a carriage 30 that is slidably mounted on the frame by suitable ways and that can be shifted by piston and cylinder assembly 31, the adjusted position being maintained by stop bolts and nuts 32.

The straight reach between the second curing drum B and tension roll E for the band X forms a third curing station or reach 33. Disposed along this reach are fixed rollers 34 that back up band Y along the reach against the force of pressure rolls 36 that press against band X along the reach by means of piston and cylinder assemblies 37 connected by a common manifold 38. Thus, the stock is confined and maintained under pressure along reach 33, although the pressure here need only be enough to maintain good contact between the bands and the stock in order to get uniform heat transfer.

In order to supply heat for the cure, piping 39 is arranged to circulate steam through first curing drum A and similar connections 41 are provided for second curing drum B.

In order that both sides of the stock may be heated during the entire cure, a number of electric radiant heating units U that extend axially across the steel bands are provided, which units supply radiant heat to band Y at the first drum A and hence to the stock, to band X at the second drum B and hence to the stock, and to both bands X and Y, along curing reach 33 and hence to the stock.

The stock may enter the apparatus as a single prefabricated strip, or as shown in the figure may enter in the form of two or more strips S and S that are joined during the cure. The cured stock passes to the usual windup W after leaving the apparatus.

To give some typical values and dimensions in one size machine and belt width, first curing drum A is 60″ in diameter and second drum B is 48″ in diameter. The rolls C, D, E and F are 40″ in diameter and drums and rolls are 88″ long. The steel bands X and Y are 80 inches wide and in the order of .080 inch thick. Band X will be placed under a total tensile force of 216,000 pounds and band Y under a force of 216,000 pounds for a 72 inches wide product.

To give a general example of a typical cure, experience has shown that a certain belt ¼ inch thick formed of rubber will require a 12 minute cure at a temperature in the range of 285° F. to 330° F. With a two drum, two band machine having drums A and B of 5 feet and 4 feet diameters, respectively, and no straight reach, and with a band having 80% contact on drum A and 70% contact on drum B, the total contact length will be 255 inches. Under these conditions, the linear speed of the belt to give a 12 minute cure will be 255 inches divided by 12 minutes or about 21 inches per minute.

It has been found that satisfactory results are obtained if high pressure on the stock is maintained for only about ⅔ of the cure. Thus, with the apparatus of this invention embodying the straight reach, and assuming that 65% of the cure is completed on drums A and B and 35% on the straight reach, the cure time on the drums for a 12 minute cure will be .65×12 minutes or 7.8 minutes, and the linear speed is now 255 inches divided by 7.8 minutes or about 32 inches per minute, giving an increase in belt speed of 50% over the speed using only the two drums for cure. This gives an important production advantage, as well as the other advantages referred to, all without appreciably increasing the tension force on the steel bands.

By conducting the cure at the two drums A and B and the straight reach 33, a relatively extensive curing surface is provided so that linear speed can be increased while giving ample curing time which in turn avoids increasing the curing temperatures to a point where the stock will be improperly cured or the finish damaged by a too rapid surface cure. For example, a short time high temperature cure results in an initial surface cure while the body of the stock remains in a plastic condition. The plastic material then tends to flow and knead and blow the cured surface skin, spoiling the finish. This greatly limits the linear speed of prior devices. This linear speed increase is attained without need for increasing the diameter of one or both curing drums. Also, the press rollers disposed along the final curing reach 33 do not materially increase the required belt tension so that the desired unit pressure on the stock as it passes around curing drums A and B can be maintained without danger of breaking the steel bands. Since the final curing stage is carried out while the stock is straight, the cured belt or band tends to lay straight, yet it has been partially cured under high unit pressure at drums A and B so that the desired expulsion of gases and compacting are obtained and the stock is given the desired surface finish.

When sheets of plastic material such as polyvinyl chloride are to be fused, the apparatus described also has important advantages. A typical polyvinyl chloride compound, for example, is fused at a temperature of 320° F. and must be brought down to a temperature of no greater than 160° F. before pressure is released. Since there is no curing action, the heating and fusing action can be completed relatively quickly but the cooling cycle is slower and determines the maximum linear speed of travel. It has been proposed to employ a two band rotary press for this purpose and to employ the first drum for heating and fusing and the second drum for cooling under pressure. The best linear speed of such a device is slow, in the order of 4 ft./min. and the capabilities of a very expensive and large piece of equipment are not realized.

In the apparatus of our invention, the second drum B can be internally cooled using fittings 41 or it may be externally cooled with fans or the like, and the material is also cooled under pressure along the straight reach 33 by the use of air blowers, refrigerated pipes or the like, not shown. By distributing the cooling cycle over the drum B and the straight reach 33, the material can be maintained under pressure and cooled to the 160° release temperature while running at a surface speed that is higher than that heretofore attainable in continuous process devices.

Having completed a detailed description of a preferred embodiment of our invention so that those skilled in the art may practice the same, we claim:

1. Apparatus for continuously heat treating lengths of plastic material under pressure comprising a pair of closely spaced, entrance and exit drums, two pairs of direction changing rolls spaced from said drums, a pair of steel bands, one of said bands being trained about one of said pair of direction changing rolls, about the entrance drum underneath the material, and about the material on the exit drum, the other of said bands being trained about the other pair of said direction changing rolls, about the material on said entrance drum, and about said exit drum underneath the material, one of each of said pair of direction changing rolls being disposed a substantial distance from said exit drum and arranged to cause said bands to travel in adjacent superposed relationship providing a straight reach of said bands in contact with the opposite sides of said material after passage about said drums, means to press said bands together against the material in the said straight reach, and temperature conditioning means cooperating with said drums and bands to effect a predetermined heat treatment of the material.

2. Apparatus for continuously fusing superposed lengths of plastic material comprising a pair of closely spaced entrance and exit curing drums, two pairs of direction changing rolls spaced from said curing drums, a pair of steel bands, one of said bands being trained about one of said pair of direction changing rolls, about the entrance drum underneath the material being cured, and about the material on the exit drum, the other of said bands being trained about the other pair of said direction changing rolls, about the material on said entrance drum, and about said exit curing drum underneath the material, one of each of said pair of direction changing rolls being disposed a substantial distance from said exit curing drum and arranged to cause said bands to travel in adjacent superposed relationship providing a straight reach of said bands in contact with the opposite sides of said material after passage about said drums, means to press said bands together against the material in said straight reach, means to apply heat to said entrance drum and means to cool the material in its travel after leaving said entrance drum.

3. A method of subjecting elongated plastic material to controlled conditions of temperature and pressure while continuously travelling in the direction of its length comprising confining the material between two inextensible heat-conductive flexible bands with the bands contacting the side faces of the material, travelling said bands and material in a path comprising sequential reversely curved and parallel straight portions with the bands under tension thereby subjecting the material to pressure, subjecting the material to predetermined temperature conditions during its travel in the said reversely curved portion of its path with the rate of travel being such that the temperature conditioning is not completed during passage of the material in the said reversely curved portion of its travel, and completing temperature conditioning of the material while subjected to pressure exerted by said bands during its passage through the said straight portion of its path of travel.

4. A method of curing elongated rubber-containing material while continuously travelling in the direction of its length comprising confining the material between two inextensible heat-conductive flexible bands with the bands contacting the opposite side faces of the material, travelling said bands and material in a path comprising sequential reversely curved and parallel straight portions with the bands under tension thereby subjecting the material to pressure, subjecting the material to rubber curing temperature during its travel in the said reversely curved portion of its path with the rate of travel of the material in such path being such that the curing is approximately 65% completed during travel of the material in the said reversely curved portion of its travel, and applying additional heat to the bands and material in the straight portion of their travel for completing the curing of the material under the pressure exerted by said bands during its passage through the said straight portion of its path of travel.

5. An apparatus for subjecting elongated plastic material to controlled conditions of temperature and pressure, comprising an entrance and an exit drum mounted for rotation in opposite directions in closely adjacent relationship, a pair of endless metal bands adapted to receive the material to be treated therebetween, a plurality of direction changing rolls cooperating with said bands to cause the latter to travel in pressure-exerting contact with the material to be treated therebetween in a reverse curved configuration about said drums and in a straight reach after leaving said drums, movable means rotatably supporting those of the direction changing rolls which determine the end of said straight reach remote from said drums, means to alter the position of said movable means for tensioning the said bands thereby maintaining them in pressure-exerting relationship with the opposite sides of the material therebetween throughout their travel about said drums and in the said straight reach, means to heat said bands and the material therebetween during their travel about said entrance drum, and temperature changing means operative to further temperature condition said bands and the material in their travel about said exit drum and in said straight reach of the bands.

6. An apparatus for subjecting elongated plastic material to controlled conditions of temperature and pressure while the material is moving, the said apparatus comprising an entrance and an exit drum mounted for rotation in opposite directions in closely adjacent relationship, a pair of endless metal bands adapted to receive the material to be treated therebetween, a plurality of direction changing rolls cooperating with said bands to cause the latter to travel in pressure-exerting contact with the material to be treated therebetween in a generally S-shaped configuration about said drums and in a straight reach after leaving said drums, a movable support for that one of said rolls cooperating with each band, at the end of said straight reach remote from said drums, a separate fluid pressure actuated means connected to each of said movable supports operative to move the latter to tension said bands thereby maintaining the bands in pressure-exerting relationship with the opposite sides of the material therebetween throughout their travel around said drums and in the said straight reach, temperature changing means cooperating with said drums and bands to subject said material to predetermined temperature conditions during travel about said drums, and other temperature changing means supported adjacent said bands in the said straight reach operative to further temperature conditioning the said material.

References Cited in the file of this patent

UNITED STATES PATENTS

| | | |
|---|---|---|
| 2,156,188 | Meyer | Apr. 25, 1939 |
| 2,267,942 | Morse | Dec. 30, 1941 |
| 2,289,388 | Stiles | July 14, 1942 |
| 2,351,861 | Knowland et al. | June 20, 1944 |
| 2,434,541 | Bierer | Jan. 13, 1948 |
| 2,438,685 | Stevens | Mar. 30, 1948 |
| 2,591,995 | Apel et al. | Apr. 8, 1952 |
| 2,714,081 | Burgon | July 26, 1955 |
| 2,751,321 | Sans | June 19, 1956 |

FOREIGN PATENTS

| | | |
|---|---|---|
| 147,000 | Australia | June 24, 1952 |